Figure 1:
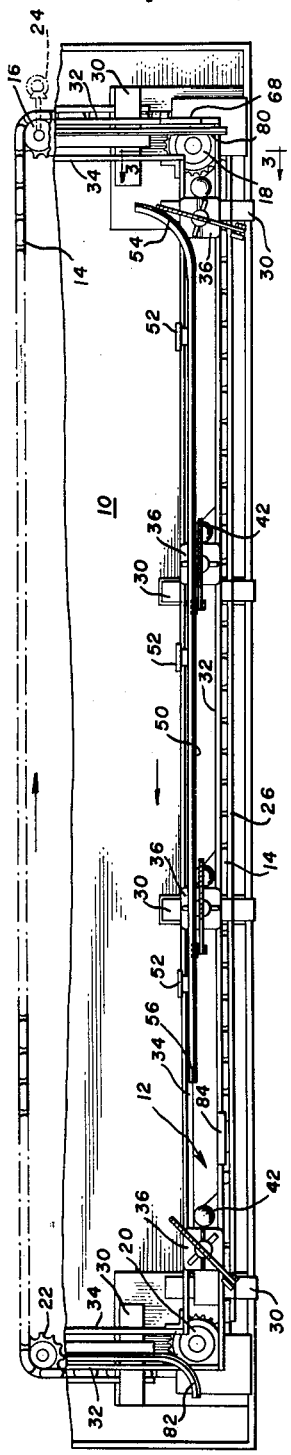

Feb. 6, 1962   J. W. GLAZE, JR., ETAL   3,019,951
STOCKING HANDLING APPARATUS
Filed April 28, 1960   2 Sheets-Sheet 1

INVENTORS
JOHN W. GLAZE JR.
JAMES C. WILSON
BY Mead, Browne, Schuyler & Beveridge
ATTORNEYS Feb. 6, 1962 J. W. GLAZE, JR., ETAL 3,019,951
STOCKING HANDLING APPARATUS
Filed April 28, 1960 2 Sheets-Sheet 2
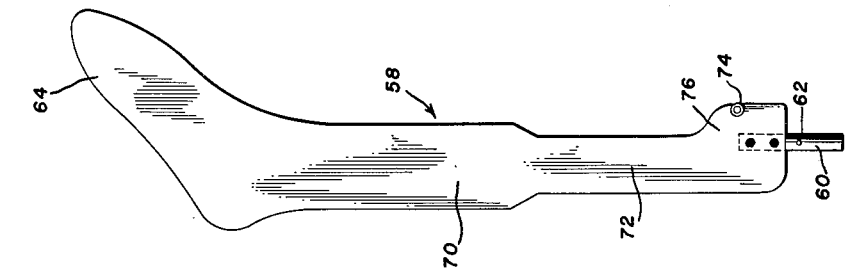
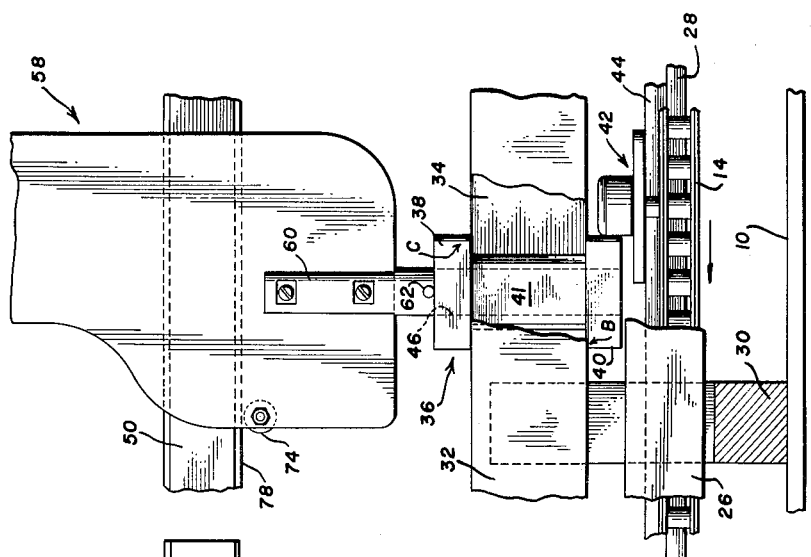
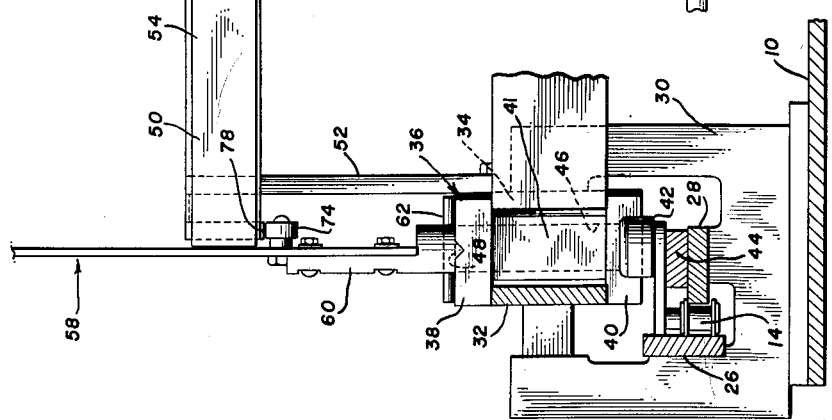
INVENTORS
JOHN W. GLAZE JR.
JAMES C. WILSON
BY
Mead, Browne, Schuyler & Beveridge
ATTORNEYS 3,019,951
STOCKING HANDLING APPARATUS
John W. Glaze, Jr., and James C. Wilson, Charlotte, N.C., assignors to Autoboard Corporation, Inc., Charlotte, N.C., a corporation of North Carolina
Filed Apr. 28, 1960, Ser. No. 25,420
7 Claims. (Cl. 223—76)

This invention relates to stocking handling apparatus, and more particularly to stocking receiving form assemblies employed by such apparatus to convey stockings to and from work stations where various operations may be performed on stockings supported upon the form assemblies. This application is a continuation-in-part of our copending application Serial No. 15,132, filed March 15, 1960.

The invention is especially directed to stocking handling appartus or machines designed to perform finishing or treating operations upon stockings after they have been knitted. One example of a machine of this type is disclosed in our copending application Serial No. 15,132 in which stockings are placed upon stocking receiving forms which are successively conveyed to a trimmer mechanism, a boarding chamber, and to a stripper mechanism where the trimmed and boarded stockings are stripped from the form. In many cases, for example in a boarding operation, the shape and size of the form must conform to the size of stockings handled on the machine and, when a run of stockings of a different size is to be handled on the machine, the forms must be removed from the machine and replaced with a set of forms corresponding to the new size of stocking. Thus, the coupling between the forms and the conveying mechanism must be such as to permit ready removal and replacement of forms on the conveying means. The structure of the form must also be such that the form may be readily oriented with respect to the conveyor so that stockings supported upon the forms may be accurately located with respect to mechanism for operating upon or handling stockings supported on the forms. In addition, the coupling between the forms and conveying means must be such that forces applied to the form, as during the placing of a stocking upon the form or the removal of the stocking from the form, do not interfere with smooth operation of the conveying means or tend to separate the forms from the conveying means.

It is a primary object of the invention to provide a stocking form receiving assembly wherein the forms may be readily placed upon or removed from a conveyor and in which external forces applied to the form during the placing of a stocking upon the form or the removal of a stocking from the form do not adversely affect operation of the conveyor or disturb the relationship between the form and conveyor.

Other objects and features of the invention will become apparent by reference to the following specification and to the drawings.

Figure 2:
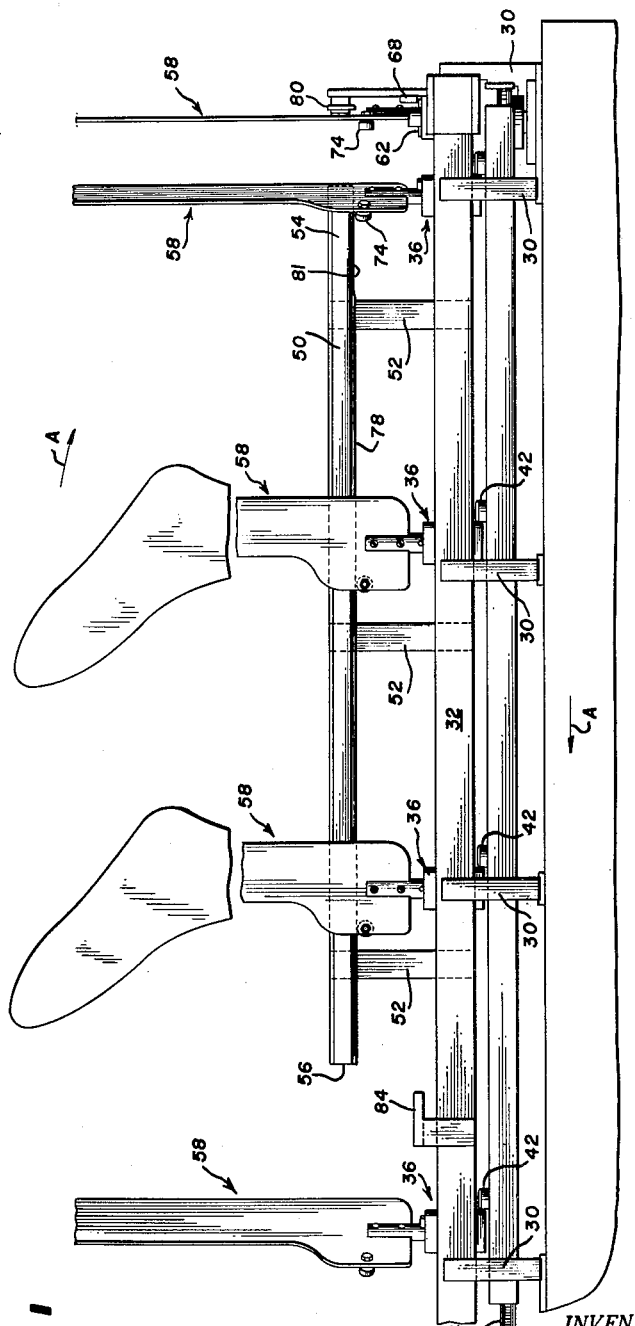

In the drawings:
FIG. 1 is a top plan view of a portion of a stocking handling machine employing forms embodying the present invention, certain portions of the machine such as cover plates being removed;
FIG. 2 is a front elevational view of the structure shown in FIG. 1 with certain parts broken away or omitted;
FIG. 3 is a cross sectional view taken on line 3—3 of FIG. 1;
FIG. 4 is a side elevational view of the structure of FIG. 3 with certain parts omitted, broken away or shown in section; and
FIG. 5 is a side elevational view of the form assembly shown in FIGS. 1 through 4.

In the drawings, the invention is disclosed as being employed in a machine for boarding stockings of the type disclosed in our copending application Serial No. 15,132. Since many details of the overall machine are not germane to the invention under discussion, only a portion of the overall machine has been disclosed. For further details of the machine, reference may be had to our copending application Serial No. 15,132.

The machine is constructed with a fixed frame 10 upon which a form carrying conveyer designated generally 12 is supported. Conveyer 12 includes an endless chain 14 which is operatively trained around sprockets 16, 18, 20 and 22, all of which are supported on frame 10 for rotation about vertical axes. Suitable driving means schematically illustrated at 24 (FIG. 1) is coupled to the sprocket 16 to drive chain 14 in a clockwise direction as viewed in FIG. 1 around a generally rectangular path whose corners are defined by the passage of chain 14 around sprockets 16, 18, 20 and 22.

The runs of chain 14 which extend between the respective sprockets are supported and guided by structure best shown in FIG. 3 which includes a pair of elongate horizontal guide strips 26 and 28 supported by and extending between a plurality of U-shaped support brackets 30 fixedly mounted upon frame 10 at spaced locations along the path of chain 14.

The legs of U-shaped brackets 30 project upwardly above chain 14 to support elongate horizontally extending inner and outer tracks 32 and 34 at a location laterally and vertically offset from chain 14. Tracks 32 and 34 cooperatively support a plurality of carrier blocks 36 for sliding movement along the path defined by the tracks. Blocks 36 are of substantially square horizontal cross section and include enlarged upper and lower flanges 38 and 40 which slideably engage the upper and lower surfaces of tracks 32 and 34. The central portion 41 of each block 36 is of a thickness such that the opposed sides of the block slideably engage the vertical facing surfaces of tracks 32 and 34.

Blocks 36 are driven along the path defined by tracks 32 and 34 by pusher assemblies designated generally 42 coupled to chain 14 at spaced locations along the chain. Pusher assemblies 42 are supported to engage the lower flanges 40 of blocks 36 by a support strip 44 (see FIGS. 3 and 4).

Each block 36 is also formed with a vertically extending central bore 46 and a notch 48 extending across the upper surface of upper flange 38. Bore 46 and notch 48 cooperate with certain elements of a stocking receiving form to be described in detail below.

A guide rail 50 is supported above track 34 by a plurality of posts 52 which are fixedly mounted at spaced locations along the inner side of track 34. As best seen in FIG. 1, the end of guide rail 50 adjacent sprocket 18 is curved as at 54 while the remaining portion of the rail extends parallel to track 34 and the path of movement of blocks 36. At its opposite end, guide rail 50 is terminated as at 56 at a location spaced well up stream from sprocket 20.

The structure described thus far is operable to convey and guide stocking receiving form assemblies along the generally rectangular path traversed by chain 14 (see FIG. 1). In the particular environment disclosed in this application, stockings are placed upon forms supported in blocks 36 as the blocks are being driven beneath that portion of the path traversed by guide rail 50 (FIG. 1). Movement of the blocks along this portion of the path is continuous and the blocks are conveyed from right to left as viewed in FIGS. 1 and 2. The path defined by tracks 32 and 34 makes right angled corners at sprockets 18 and 20 and in traversing these right angled corners, the blocks 36 remain stationary momentarily while pusher assemblies 42 are disengaged from one side of the block and moved into engagement with an adjacent side of the block. This action is accomplished by structure shown in greater detail in our copending application. In the machine partially disclosed in this application, stockings on the forms are subjected to a boarding atmosphere during transit of that portion of the path between sprockets 22 and 16 (FIG. 1). When the boarded stockings are conveyed to the corner overlying sprocket 18, they are removed from the forms either automatically or manually during the interval of time in which the form supporting carrier block 36 remains stationary in the corner.

In stocking handling operations where the stocking is placed upon a form, different sized stockings require the use of different sized forms. The machine partially disclosed in this application, for example, usually employs a set of thirty-nine forms which must be changed each time a run of different sized stockings is to be handled by the machine. For convenience in removing and replacing the forms, the stocking receiving form assembly disclosed in this application includes a flat stocking receiving form designated generally 58 having a vertical support rod 60 fixedly mounted upon form 58 and projecting downwardly from the lower end of the form. Rod 60 is of a diameter such that it is slideably received within the bore 46 of the carrier blocks. A cross pin 62 projects outwardly from opposite sides of support rod 60 and, by the engagement between cross pin 62 and the upper surface of upper flange 38, the stocking form assembly is supported by blocks 36 in a manner such that the upwardly and forwardly projecting stocking foot receiving portion 64 of the forms is supported at a predetermined height above tracks 32 and 34. This feature is of interest in cases where mechanism is employed to automatically strip or remove stockings from the form, since in such cases it is necessary to locate the foot portion of the form in operative relationship with the stripping mechanism, regardless of the sized stocking which the form is adapted to handle.

Whether the stocking is pulled from the form manually or by a stripping mechanism, removal of the stocking from the form tends to pull the form assembly upwardly out of carrier block 36. Cross pin 62 is employed in the machine disclosed in this application to prevent this action. A stationary abutment 68 is mounted upon the machine frame at a position where abutment 68 overlies cross pin 62 when the form assembly is at the location where the stocking is removed from the form. Upward movement of the form occasioned by the removal of the stocking lifts pin 62 upwardly into engagement with the lower surface of abutment 68 (FIG. 2), thus maintaining the form assembly in operative relationship with its associated carrier block.

As best seen in FIG. 2, form assemblies 58 are driven along guide rail 50 with foot portion 64 of the form pointing forwardly in the direction of movement of the form along the guide rail. As the form is conveyed along guide rail 50, the operator of the machine manually places a stocking on the form by drawing the stocking over foot portion 64 and pulling the stocking downwardly onto the form to locate the welt on the intermediate or leg receiving portion 70 of the form. This action exerts a force on the form tending to tilt the upper portion of the form rearwardly in the direction of arrow A (FIG. 2) in the vertical plane of movement of the form established by the engagement of one side of the lower or shank portion 72 of the form with the side of guide rail 50. Tilting movement of the upper end of the form in the foregoing manner is transmitted to the associated carrier block 36 in a manner tending to tilt the block into a position inclined upwardly and to the right as viewed in FIG. 4. Tilting movement of the block in this manner urges the leading edge of lower flange 40 of block 36 upwardly against the lower surfaces of tracks 32 and 34 in the direction indicated by arrow B in FIG. 4 and drives the trailing edge of upper flange 38 downwardly against the upper surfaces of tracks 32 and 34 as indicated by the arrow C in FIG. 4. This action tends to lock carrier block 36 against tracks 32 and 34.

To prevent locking of blocks 36 in the foregoing manner during the applying of a stocking to the form, a roller 74 is rotatably supported on a forward projection 76 at the lower end of shank portion 72. As best seen in FIG. 3, roller 74 is laterally offset from the side of form 58 to ride immediately beneath the lower edge surface 78 of guide rail 50. Rearward tilting movement of the upper portion of the form as a stocking is being placed on the form tends to shift roller 74 upwardly into engagement with the lower surface of guide rail 50 and thus rearward tilting movement of the form is restricted by the engagement of roller 74 with the lower edge 78 of guide rail 50.

As the forms are driven by chain 14 from sprocket 16 toward sprocket 18, the form is oriented and guided by a fixed guide rail 80 so that the foot portion 64 of the form lies in a plane parallel to guide rail 80 and points forwardly with respect to its direction of movement. This particular orientation provides the most convenient means for stripping stockings from the form since the toe portion of the form points toward the front of the machine. During transit of this portion of the path, cross pins 62 are received in grooves 48 on the top of the associated carrier block. After the stocking has been removed from the form and the block begins to move away from the corner overlying sprocket 18, it is desirable to rotate the form about the axis of support rod 60 through an angle of 90° so that the foot portion of the form points forwardly in the new direction of movement from right to left as viewed in FIG. 1. Engagement between the side of the form and curved portion 54 of the guide rail 50 as the roller is moved beneath the rail, assure that no interference occurs between roller 74 and and guide rail 50 as the roller is moved beneath the rail, the leading end portion of guide rail 50 is relieved along lower surface 78 as at 81.

Removal and replacement of forms within the blocks 36 is performed while the blocks are traversing that portion of their path of movement extending between trailing end 56 of guide rail 50 and sprocket 20. Along this portion of the path, no structure overlies cross pin 62 or roller 74 and thus the form to be removed is merely lifted upwardly out of bore 46 in the carrier block and the replacement form is simply dropped into the bore. The orientation of the foot portion of the replacement form as it is dropped into block 36 is not particularly critical beyond the requirement that the foot portion should be inclined somewhat with respect to its direction of movement toward sprocket 20 in a direction outwardly of the machine. A guide rail 82 acts to orient the form as it begins to traverse that portion of the path extending from sprocket 20 to sprocket 22. In the case where replacement of the forms is not required, a stationary abutment 84 is mounted upon outer rail 32 to engage cross pin 62 on the form assemblies as they pass abutment 84 to rotate the forms partially toward the desired orientation.

While we have disclosed and described one embodiment of the invention, it will be apparent to those skilled in the art that the structure described above may be modified. Therefore, the full drawing description is to be considered exemplary rather than limiting, and the true scope of the invention is that defined in the following claims.

We claim:

1. A stocking receiving form assembly for a stocking handling machine, said assembly comprising a stocking receiving form having a vertically extending shank portion at its lower end and an upwardly and forwardly pointing stocking foot receiving portion at its upper end, a vertical support rod fixedly secured to and projecting downwardly from the lower end of said shank portion for free vertical sliding movement into and out of a vertical rod receiving bore in a carrier movable along a path in the stocking handling machine, and means projecting laterally from one side of said shank portion at a location horizontally offset from said rod for engaging a guide rail extending along one portion of the path of movement of the carrier when said form is supported on said carrier to restrict rearward tilting movement of the upper end of said form as a stocking is drawn onto said form while said form is carried by said carrier along said first portion of said path.

2. A stocking receiving assembly for a stocking handling machine, said assembly comprising a stocking receiving form having a vertically extending shank portion at its lower end and an upwardly and forwardly pointing stocking foot receiving portion at its upper end, a vertical support rod fixedly secured to and projecting downwardly from the lower end of said shank portion for free vertical sliding movement into and out of a vertical rod receiving bore in a carrier movable along a path in the stocking handling machine, a cross pin mounted upon said rod and projecting horizontally outwardly from opposed sides of said rod for engaging the upper surface of the carrier to thereby locate the foot portion of said form at a preselected distance above said carrier while permitting free vertical withdrawal of said rod from said bore, and means projecting laterally from one side of said shank portion at a location horizontally offset from said rod for engaging a guide rail on the machine when said form is conveyed by said carrier along one portion of said path to restrict rearward tilting movement of the form and said support rod when a stocking is drawn onto said form.

3. A stocking receiving form assembly for a stocking handling machine, said assembly comprising a stocking receiving form having a vertically extending shank portion at its lower end and an upwardly and forwardly pointing stocking foot receiving portion at its upper end, a vertical support rod fixedly secured to and projecting downwardly from the lower end of said shank portion for insertion into a vertical rod receiving bore in a carrier movable along a path in the stocking handling machine, a roller mounted upon said shank portion for rotation about a horizontal axis extending normal to said shank portion and the direction of movement of said form by the carrier, said roller being located forwardly of said support rod to engage the lower surface of a guide rail on the machine extending along one portion of the carrier path when said form is supported on said carrier to restrict rearward tilting movement of the form and said support rod when a stocking is drawn onto said form as said form is conveyed by said carrier along said one portion of said path.

4. A stocking receiving form assembly for a stocking handling machine, said assembly comprising a stocking receiving form having a vertically extending shank portion at its lower end and an upwardly and forwardly pointing stocking foot receiving portion at its upper end, a vertical support rod fixedly secured to and projecting downwardly from the lower end of said shank portion for free vertical sliding movement into and out of a vertical rod receiving bore in a carrier movable along a path in the stocking handling machine, a cross pin fixedly mounted upon said rod and projecting outwardly from opposed sides thereof to engage the upper surface of said carrier to support the foot portion of said form at a predetermined distance above said carrier when said rod is located within said bore while permitting free vertical withdrawal of said rod from said bore, and a roller mounted upon said shank portion for rotation about a horizontal axis parallel to said cross pin, said axis being located above and forwardly of said cross pin with said roller being located to engage the lower surface of a guide rail on the machine when said form is supported on said carrier to restrict rearward tilting movement of said form and said support rod when a stocking is drawn onto said form.

5. For use in combination with a conveyer including a carrier element having a vertical bore therein, means for driving said carrier element along a path, and a guide rail extending above said path in parallel relationship thereto along a first portion of said path a stocking receiving form assembly comprising a support rod adapted to be slideably received within said bore, a stocking receiving form having a stocking foot receiving portion at its upper end, means fixedly mounting the lower end of said form on said support rod, means projecting outwardly from opposed sides of said support rod engageable with the upper surface of said carrier when said rod is received within said bore to support said foot portion of said form at a predetermined distance above said carrier while permitting free vertical withdrawal of said rod from said bore, and means on the lower end of said form engageable with said guide rail when said form is conveyed by said carrier along said first portion of said path to restrict both horizontal and vertical pivotal movement of said form.

6. For use in combination with a conveyor including a carrier element having a vertical bore therein, means for driving said carrier element along a path, and a guide rail extending above said path in parallel relationship thereto along a first portion of said path: a stocking receiving form assembly comprising a support rod adapted to be slideably received within said bore, a flat stocking receiving form having a stocking foot receiving portion at its upper end, means fixedly securing the lower end of said form to said support rod, means on said rod engageable with the upper surface of carrier element to locate one side of said form in face to face guiding relationship with said guide rail when said rod is received in said bore to thereby maintain said form in a general vertical plane extending parallel to the path of movement of said carrier element as said form is conveyed along said first portion of said path, and means projecting laterally from one side of said form engageable with said guide rail when said form is conveyed by said carrier element along said first portion of said path to restrict tilting movement of said form within said general vertical plane.

7. For use in combination with a conveyor including a carrier element having a vertical bore therein, means for driving said carrier element along a path, and a guide rail located above said path having a vertical side surface and a horizontal edge surface extending parallel to a first portion of said path: a stocking receiving form assembly comprising a support rod adapted to be slideably received in said bore, a flat stocking receiving form having a stocking foot receiving portion at its upper end, means fixedly securing the lower end of said form to said support rod, means on said rod engageable with the upper surface of said carrier element to locate one side of said form in face to face guiding relationship with said vertical side surface of said guide rail when said support rod is received in said carrier element to maintain said form in a vertical plane during its transit of said one portion of said path, and means projecting laterally from said one side of said form engageable with said edge surface of said guide rail when said form is supported on said carrier to restrict tilting movement of said form within said vertical plane when a stocking is drawn onto said form.

References Cited in the file of this patent

UNITED STATES PATENTS

| | | |
|---|---|---|
| 1,126,619 | Coulston et al. | Jan. 26, 1915 |
| 2,154,369 | Wanamaker | Apr. 11, 1939 |